(12) United States Patent
Jungmann et al.

(10) Patent No.: US 8,128,818 B2
(45) Date of Patent: Mar. 6, 2012

(54) OIL FILTER

(75) Inventors: Peter Jungmann, Rangendingen (DE); Alexander Maute, Hechingen-Stetten (DE); Friedhelm Pfitzer, Rangendingen (DE); Jan Maier, Moessingen (DE)

(73) Assignee: Joma-Polytec Kunststofftechnik GmbH, Bodelshausen (DE)

( * ) Notice: Subject to any disclaimer, the term of this patent is extended or adjusted under 35 U.S.C. 154(b) by 683 days.

(21) Appl. No.: 11/990,709

(22) PCT Filed: May 20, 2006

(86) PCT No.: PCT/EP2006/004806
§ 371 (c)(1),
(2), (4) Date: Dec. 22, 2008

(87) PCT Pub. No.: WO2007/022812
PCT Pub. Date: Mar. 1, 2007

(65) Prior Publication Data
US 2009/0218269 A1    Sep. 3, 2009

(30) Foreign Application Priority Data

Aug. 25, 2005 (DE) .......... 10 2005 041 040
Sep. 2, 2005 (DE) .......... 10 2005 042 713

(51) Int. Cl.
*B01D 35/147* (2006.01)
*B01D 27/10* (2006.01)
*B01D 35/30* (2006.01)

(52) U.S. Cl. ........ 210/232; 210/234; 210/437; 210/440; 210/441

(58) Field of Classification Search .......... 210/232, 210/234, 235, 248, 437
See application file for complete search history.

(56) References Cited

U.S. PATENT DOCUMENTS

| 5,045,192 | A * | 9/1991 | Terhune .......... 210/232 |
| 5,308,485 | A * | 5/1994 | Griffin et al. .......... 210/232 |
| 5,770,054 | A | 6/1998 | Ardes |
| 6,569,326 | B1 * | 5/2003 | Baumann et al. .......... 210/232 |
| 6,685,829 | B1 * | 2/2004 | Baumann et al. .......... 210/232 |
| 7,147,110 | B2 * | 12/2006 | Clausen et al. .......... 210/436 |
| 7,854,329 | B2 * | 12/2010 | Malgorn et al. .......... 210/437 |
| 2006/0118476 | A1 * | 6/2006 | Weindorf et al. .......... 210/234 |
| 2007/0000830 | A1 * | 1/2007 | Snider et al. .......... 210/232 |

FOREIGN PATENT DOCUMENTS

| DE | 34 22 482 | 12/1985 |
| DE | 40 22 723 | 4/1991 |
| DE | 44 08 888 | 9/1994 |
| DE | 43 30 840 | 2/1995 |
| DE | 4430341 A1 * | 3/1995 |
| DE | 296 10 290 | 10/1996 |
| DE | 197 00 564 | 7/1998 |

(Continued)

Primary Examiner — Tony G Soohoo
Assistant Examiner — Peter Keyworth
(74) Attorney, Agent, or Firm — Paul Vincent

(57) ABSTRACT

An oil filter arrangement, has a housing (12) with a receiving space (18) for a filter element (20) which can be inserted into the housing and through which oil can flow radially, with an oil inlet (34) and an oil outlet (32), and with a supporting tube (22) which is present in the receiving space and supports the filter element. The supporting tube is inserted into the receiving space and is fastened to the housing in such a manner that it remains in the housing when the filter element is exchanged.

7 Claims, 6 Drawing Sheets

FOREIGN PATENT DOCUMENTS

| | | |
|---|---|---|
| DE | 299 17 562 | 3/2001 |
| DE | 202 13 507 | 1/2004 |
| DE | 202 13 512 | 1/2004 |
| DE | 102 59 884 | 7/2004 |
| EP | 0 612 549 | 8/1994 |
| EP | 1 093 840 | 4/2001 |
| JP | 3-79809 | 8/1991 |
| JP | 6-73305 | 10/1994 |
| WO | WO 01/39864 | 6/2001 |
| WO | WO 2005/011838 | 2/2005 |

\* cited by examiner

OIL FILTER

This application is the national stage of PCT/EP2006/004806 filed on May 20, 2006 and also claims Paris Convention priority to DE 10 2005 041 040.5 filed Aug. 25, 2005 and DE 10 2005 042 713.8 filed Sep. 2, 2006.

BACKGROUND OF THE INVENTION

The invention concerns an oil filter arrangement comprising a housing with a receiving space for a filter element that can be inserted into the housing and through which oil can flow in a radial direction, and a support tube that bears the filter element when it is inserted.

There are a plurality of conventional oil filter arrangements of this type, e.g. oil filter arrangements, wherein the support tube, through which a flow may extend in the axial direction, is disposed on a lid that closes the receiving space. An embodiment of this type is disclosed e.g. in the prior document DE 102 59 884.

The arrangement of the support tube on the lid is comparatively difficult, since the lid including support tube must be removed for exchanging the filter element. Moreover, the filter element must be removed from the support tube.

EP 0 612 549 A and DE 43 30 840 C1 disclose oil filter configurations having a support body or standing tube which is inserted into the receptacle region to screw or snap into the housing in such a manner as to remain in the housing when the filter element is replaced.

WO 07/39864 A discloses an oil filter configuration with which a supporting lid, having a collar disposed on the free end of the support tube, is held in the receptacle region of the filter element by means of a holding element which is configured as a separate member in addition to the support tube by means of a support of the holding element which cooperates with the collar. The holding element, and not the support lid, is thereby securely screwed to the housing.

It is the underlying purpose of the present invention to provide an oil filter arrangement that has a comparatively simple structure and ensures operationally reliable arrangement of the support tube.

SUMMARY OF THE INVENTION

This object is achieved by an oil filter arrangement of the above-mentioned type having the features of the independent claim. Disposition of the support tube in the receiving space and attachment thereof to the housing such that it remains in the housing when the filter element is exchanged yields great advantages, in particular, for the production of the oil filter arrangement. The housing as such can be produced in a conventional fashion. The housing may be produced, in particular, from plastic material. The can-shaped designed support tube can thereby be produced separately from the housing and be inserted into and attached to the housing. This ensures reliable arrangement of the support tube, wherein the filter element can be pushed onto the support tube or be removed from the support tube. When the filter element is exchanged, the support tube remains in the housing, thereby facilitating overall handling.

In accordance with the invention, the housing has mounting sections in the area of the bottom of the receiving space, and the side of the support tube facing the bottom of the receiving space has mounting areas that correspond with the mounting sections. Provision of the mounting sections in the area of the bottom of the receiving space, in particular, about the center longitudinal axis of the support tube, yields reliable arrangement of the support tube without impairing radial passage of the filter element and support tube.

Connecting pins or pin recesses that correspond with the connecting pins are moreover provided on the mounting sections or the mounting areas. The connecting pins and the corresponding pin recesses realize simple, permanent and undetachable arrangement of the support tube on the housing.

The connecting pins are thereby disposed on the bottom of the receiving space, distributed about the center longitudinal axis of the receiving space or the support tube. In particular, two, three or four connecting pins may be provided that engage in corresponding pin recesses on the support tube side which correspond with the connecting pins. Arrangement of the connecting pins or pin recesses about the center longitudinal axis of the support tube or the receiving space is advantageous in that the oil in the support tube can flow along the center longitudinal axis into an oil outlet provided in this area. Consequently, the pins or pin recesses do not impair the discharge of the oil from the support tube. The individual connecting pins may thereby advantageously be disposed at equal distances from the respectively neighboring connecting pins.

In order to provide operationally reliable mounting of the support tube, the mounting areas are designed as feet that project in a radially outward direction or as a collar that projects in a radially outward direction and is circumferential at least in sections. The feet or the collar have pin recesses that correspond with the connecting pins. By providing the feet or the collar, the forces that act in the transverse direction on the support tube or on the filter element disposed onto the support tube, can advantageously be diverted into the housing. By providing such feet or webs, the support tube may moreover be inserted in an axial direction into the receiving space for assembly.

The support tube may thereby, in particular, be locked, screwed and/or fastened like a bayonet and/or in an undetachable fashion to the housing. For locking, corresponding locking means must be provided. For screwing, corresponding threads and/or screws must be provided. For bayonet-like fastening, the support tube is initially introduced along its longitudinal axis into the receiving space and then fixed by turning it about is longitudinal axis by means of undercut sections that must be correspondingly provided.

The connecting pins may also be designed e.g. as rivet pins and, in particular, as weld rivet pins. The rivet pins can be riveted after insertion of the support tube in such a fashion that an undetachable connection between the support tube and the housing is provided. In particular, when both the housing as well as the support tube are made from plastic material, it is advisable to realize the undetachable connection by hot riveting.

It is also feasible to design the connecting pins as weld or hot riveting pins, such that the support tube is detachably connected to the housing in that the pin recesses are designed like a bayonet. The support tube may then be inserted e.g. in the axial direction into the receiving space, such that the connecting pins come into engagement with the pin recesses. In a further step, the free ends of the connecting pins may be hot-riveted. When the support tube shall be removed from the receiving space at a later time, it can be turned about its center longitudinal axis until the rivet heads reach the areas of the pin recesses that have a clearance cross-sectional surface that is larger than the diameter of the hot-riveting heads. The support tube may then be removed from the receiving space in an axial direction. Instead of hot-riveted connecting pins, one can also use connecting pins being shaped like screws with a screw head that forms the widening.

In accordance with the invention, the connecting pins may, however, also be designed as locking pins. In accordance with the invention, the support tube may also be fastened to the housing by locking, in particular, undetachable locking engagement of the locking pins behind the pin recesses.

In accordance with the invention, the support tube may also be mounted to the housing via screw connections.

In a preferred embodiment of the invention, the mounting sections to the housing are designed as webs that extend in an axial and/or radial direction, and whose upper sides facing the filter element each bear at least one connecting pin. The webs thereby advantageously extend from the bottom of the receiving space in an axial upward direction and form an abutment for the support tube. When the support tube is inserted, it consequently abuts the upper side of the webs. When rivet pins are provided, a rivet connection between the webs and the support tube may be realized. Riveting may advantageously be performed in an axial direction from the top. The webs may thereby extend, at least in sections, in a radial direction over the bottom of the receiving space, which increases the rigidity of the housing.

In accordance with a further advantageous embodiment of the invention, the connecting pins may engage into the connecting areas in such a fashion that the support tube can be moved in an axial direction from an operating position assumed when the receiving space is closed, into an outlet position that can be assumed when the receiving space is open, wherein in the outlet position, in particular, unfiltered oil can flow out of the receiving space. In consequence thereof, the connecting pins with associated mounting areas prevent removal of the support tube when the filter element is changed, but still allow a certain axial motion of the support tube. The support tube can consequently be moved to the outlet position in which the oil in the receiving space can flow out before the filter element is completely removed from the receiving space. For this reason, after opening the receiving space and moving the support tube into the outlet position, one can wait until a sufficient amount of the oil in the receiving space has flowed out of the receiving space, such that the filter element can be removed without losing a major amount of oil.

Towards this end, the connecting pins may comprise a mushroom head-like widening, e.g. in the form of a hot-riveting head, in the area of their free ends, wherein the separation between the bottom of the receiving space and the lower edge of the widening is at least slightly larger than the thickness of the mounting areas extending in the axial direction. This yields a certain play that permits limited axial displacement of the support tube.

A spring element may advantageously be provided between the bottom of the receiving space and the mounting areas, which loads the support tube away from the bottom. This yields automatic displacement of the support tube away from the bottom when the receiving space is opened, e.g. when a lid that closes the receiving space is unscrewed.

The support tube may thereby come into engagement with an oil outlet on the side facing away from the filter element in such a fashion that, in the operating position, unfiltered oil cannot flow via the support tube into the oil outlet, and in the outlet position, an outlet recess provided on the support tube, corresponds with the receiving space, and unfiltered oil can flow into the oil outlet via the outlet recess. In the operating position, the outlet recess consequently does not correspond with the receiving space. The outlet recess reaches the area of the receiving space only when the support tube is displaced into the outlet position, such that oil can be discharged via the outlet recess. Since the outlet recess in the outlet position in the receiving space corresponds in the area of its bottom, it is ensured that the oil in the receiving space can largely be discharged via the outlet recess and the oil outlet.

In the operating position, the purified oil that flows through the filter element is advantageously discharged from the oil filter arrangement via the oil outlet. Consequently, the oil outlet has two functions: In the operating position, purified oil flows from the oil filter arrangement via the oil outlet, and in the outlet position, in particular, unfiltered crude oil flows from the oil filter arrangement via the oil outlet. In an advantageous embodiment of the invention, in the area of the bottom of the receiving space, the support tube may surround a pressure tube that is closed in the radial direction and is disposed at a radial separation from the support tube. When the support tube is inserted, it may e.g. be disposed onto the pressure tube. The pressure tube is then used as joining aid.

In accordance with a further development of the invention, an overpressure bypass valve may furthermore be disposed on the free side of the support tube facing away from the bottom of the receiving space.

A valve of this type opens when a limit pressure has been exceeded, e.g. when the filter element clogs due to soiling.

In accordance with the invention, an outlet opening may be provided on the bottom of the receiving space and an outlet valve may be provided in the outlet opening. The outlet valve is thereby in the closed position when the filter element is inserted, wherein a guidance for a compensation body of the outlet valve is provided, in particular, on the support tube and, in particular, on the collar or on a foot of the support tube. The guidance guides the compensation body in an axial direction, wherein forces that act on the compensation body from a transverse direction can be diverted into the housing via the guidance. Instead of the support tube, another suitable component that is disposed on the housing may be used for guiding the compensation body.

The compensation body is thereby used to balance axial tolerances of the housing and/or filter element. Towards this end, it should radially project past the bottom of the receiving space. It must also be secured against transverse forces, since it could happen that the filter element is carried along by the rotary motion of the lid when the lid that closes the receiving space is unscrewed. This is achieved by corresponding guidance of the compensation body.

In this connection, DE 44 08 888 C2 discloses to guide the compensation body (called actuating body therein) with its outer circumference along the wall of the outlet channel. Occurring transverse forces are consequently diverted to the wall of the outlet channel. Due to arrangement of the outlet valve in the outlet channel, dirt and impurities can accumulate at that location of this conventional device, which can have a negative influence on the function of the compensation body and of the entire outlet valve. This can occur outside of the outlet channel and, in particular, above the bottom of the receiving space due to the fact that, in accordance with this embodiment of the invention, in particular, the support tube guides the compensation body. This is advantageous in that the oil in the receiving space flows through the compensation body and for this reason, no soiling or deposits can collect in and impair the compensation body. The compensation body is moreover reliably protected from deflection by transverse forces.

The axial movability of the compensation body may moreover be limited by the guidance on the support tube. The guidance then additionally also ensures that the compensation body is reliably secured in an axial direction.

In accordance with an advantageous embodiment of the invention, the guidance for the compensation body is designed as an opening on the foot or collar of the support tube. This may be, in particular, a closed circular opening whose inner diameter is slightly larger than the outer dimensions of the compensation body.

In accordance with the invention, the outlet valve may comprise a valve body that can be movably displaced between a closed position and an open position, and is loaded by a first spring element into the closed position when the filter element is inserted, and is loaded by a second spring element into the open position, the second spring element being weaker than the first spring element, and wherein the compensation body is axially displaceably disposed on the valve body and is loaded by the first spring element against the filter element when the filter element is inserted. Such an arrangement has proven to be particularly suitable and reliable.

Further details and advantageous embodiments of the invention can be extracted from the following description that describes and explains the embodiment shown in the drawing in more detail.

DESCRIPTION OF THE PREFERRED EMBODIMENT

Figure 1:
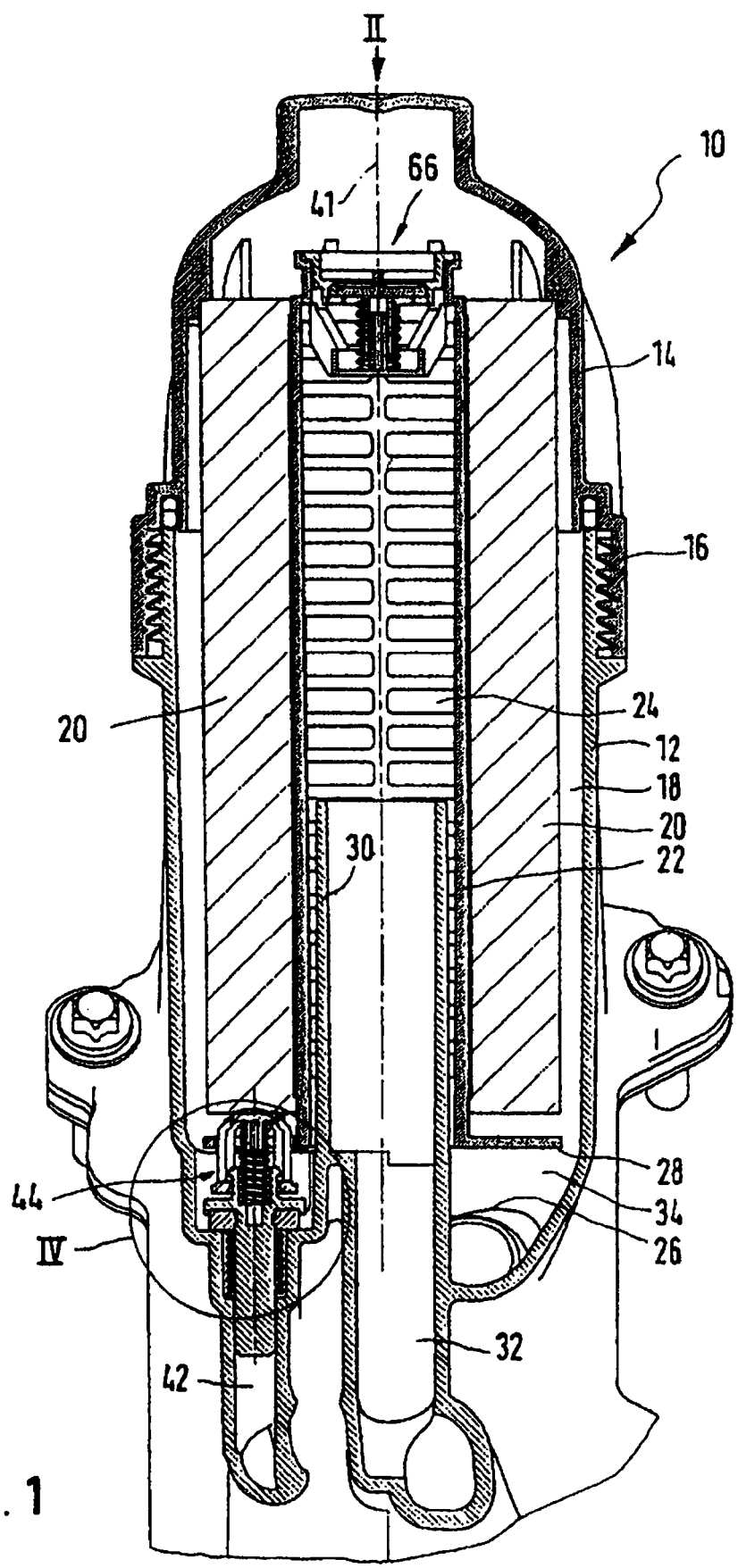
FIG. 1 shows a longitudinal section through a first inventive oil filter arrangement.

The oil filter arrangement 10 shown in FIG. 1 comprises a housing 12 to which a lid 14 can be screwed via a thread 16. The housing 12 and the lid 14 surround a receiving space 18 that contains a filter element 20 through which oil can flow in a radial direction. The filter element 20 is thereby supported by a frame-like support tube 22. The support tube 22 has a plurality of openings 24 through which oil can flow in a radial direction. The support tube 22 has a circumferential annular collar 28 on its side facing the bottom 26 of the receiving space, which extends in a radial outward direction. In accordance with the invention, only annular collar sections or feet that extend in a radial outward direction may be provided instead of the circumferential annular collar.

In the lower area, the support tube 22 surrounds a pressure tube 30 which is disposed at the bottom 26 of the receiving space, extends in an axial upward direction, and is closed in the radial direction. The pressure tube 30 opens into an oil outlet 32 for filtered purified oil. An oil inlet 34 for crude oil to be filtered is provided in the area of the bottom 26 of the receiving space 18.

During operation of the oil filter arrangement, the crude oil to be filtered flows from the oil inlet 34 in a radial direction through the filter element 20 to the oil outlet 32.

Figure 2:
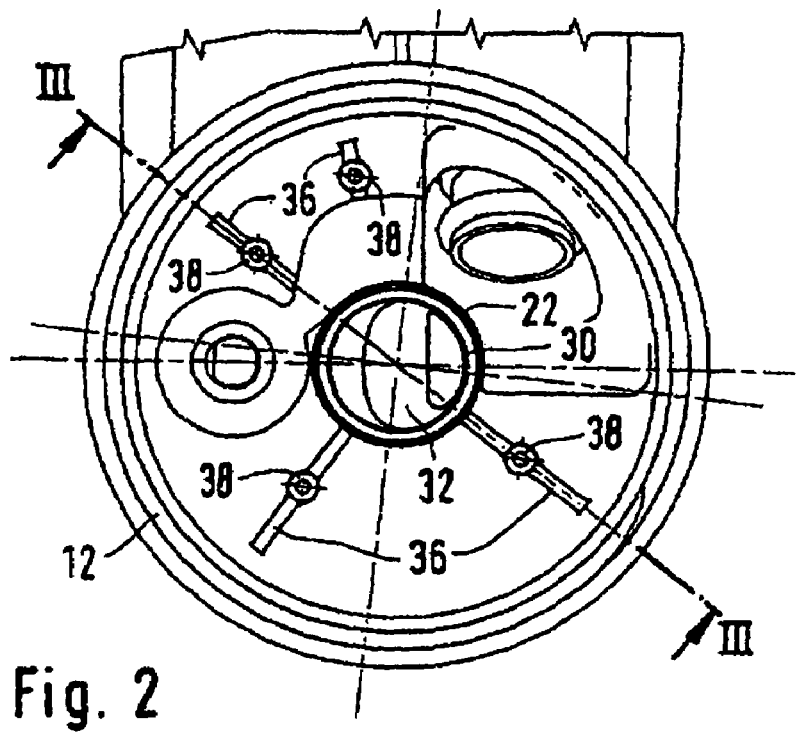
FIG. 2 shows a top view in accordance with the arrow II of FIG. 1.
Figure 3:
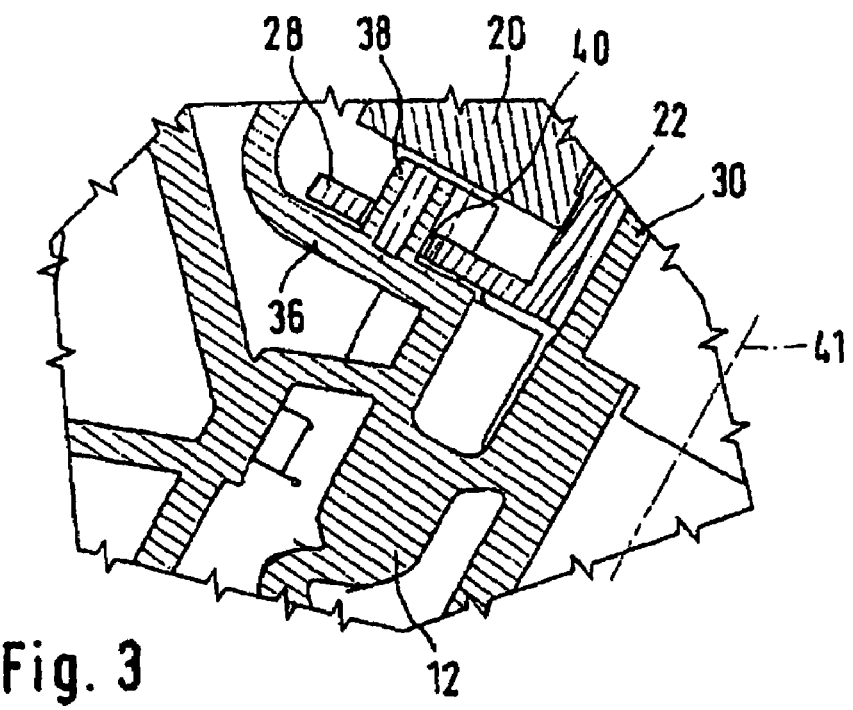
FIG. 3 shows a partial section along the line III of FIG. 2.

The support tube 22 is axially inserted from the top into the receiving space 18, where it is undetachably fastened. Towards this end, mounting sections 36 are provided in the area of the bottom 26 in the view of FIG. 2 which shows the top view of the bottom 26. Such a mounting section 36 is shown in an enlarged scale in the sectional view of FIG. 3. FIG. 3 clearly shows that a connecting pin 38 is disposed on the upper side of the web-like mounting sections 36 facing the filter element, which is represented as a hollow weld rivet pin in the non-riveted state. The pin 38 thereby engages in a corresponding pin recess 40 provided on the collar 28 of the support tube 22. For undetachable and permanent mounting of the support tube 22, the connecting pins are plastically deformed by hot riveting. The support tube 22 and the housing 12 are thereby produced from plastic material. Instead of hot riveting, the pins may also have inner or outer threads, such that the collar 28 can be screwed to the housing via screws or nuts. When the filter element 20 is not inserted, the connecting pins 38 can be axially accessed from the top.

As is clearly shown, in particular, in FIG. 3, the upper side of the mounting sections 36 extends parallel to the collar 28 or perpendicularly to the center longitudinal axis 41 of the housing 12. This produces an optimum abutment surface between the mounting sections 36 and the collar 28. When the support tube 22 is inserted, it can be disposed onto the pressure tube 30 until the collar 28 comes to rest on the mounting sections.

As is shown in FIG. 1, an outlet opening 42 is provided on the bottom 26 of the housing 12, in which an outlet valve 44 is disposed. When the filter element 20 is inserted, the outlet valve 44 is in its closed position.

Figure 4:
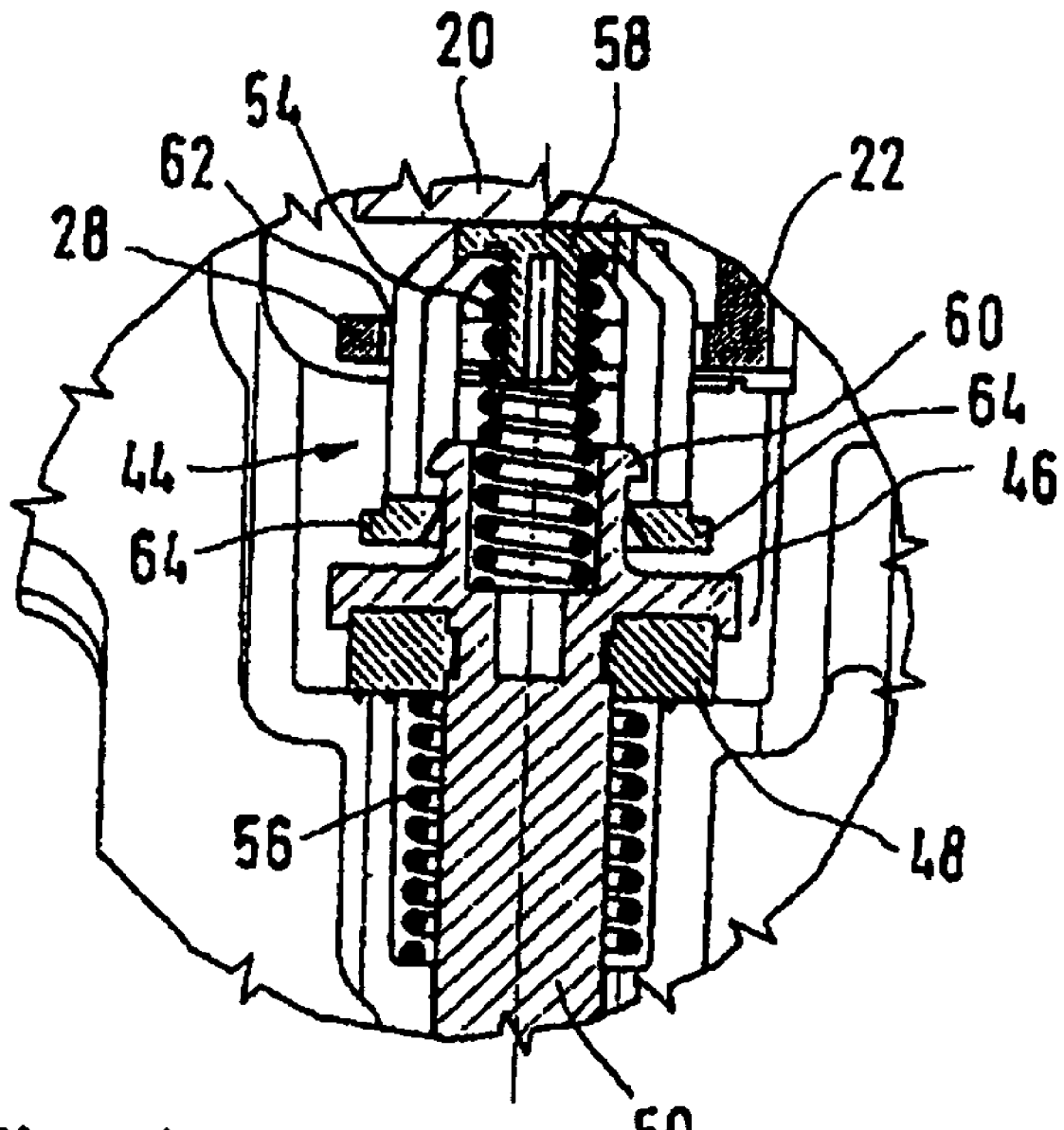
FIG. 4 shows an enlarged view of the area IV of FIG. 1.

The enlarged view of FIG. 4 clearly shows that the outlet valve 44 has a valve body 46 that can be moved between a closed position and an open position and bears an annular sealing element 48. The valve body 46 has a guiding pin 50 that extends in the axial direction and cooperates with a guiding section 52 of the outlet opening 42. The guiding pin 50 may thereby have e.g. a crossrib-like cross-section, such that the oil can flow along the guiding pin into the outlet opening 42 or into an outlet channel.

The valve body 46 is loaded into its closed position via a first spring element 54. A second spring element 56, which is weaker than the first spring element 54, loads the valve body 46 into the open position. A compensation body 58 is provided between the spring element 54 and the filter element 20, which is disposed on the valve body 46 such that it can be axially displaced. The compensation body thereby balances the axial tolerances of the housing and/or filter element.

When the filter element is inserted, the valve body 46 is loaded via the compensation body 58 and the stronger spring element 54 into the closed position. When the filter element 20 is removed, the compensation body 58 initially moves in an axial upward direction until it meets a stop 60 on the compensation body 58. Due to the spring force of the spring element 56, the valve body 46 moves in an axial upward direction, thereby opening the outlet opening 42 and permitting oil provided in the housing 12 to flow out via the outlet opening 42. The compensation body 58 is thereby designed like a cage such that oil can flow through it.

As is clearly shown in FIG. 4, the collar 28 has a guidance 62 in the form of an opening in the area of the compensation body 58. The guidance 62 thereby guides the compensation body 58 in an axial direction and prevents deflection of the compensation body in the transverse direction. The guidance 62 moreover serves as a stop for radially outwardly directed retaining sections 64 on the compensation body 58 whose radial outer dimensions are slightly larger than the diameter of the guidance 62. The compensation body 58 is thereby undetachably disposed in the housing 12. When the filter element is removed, the compensation body 58 can consequently not be removed in an axial upward direction.

Due to undetachable mounting of the support tube 22, the outlet valve 44 is consequently also permanently and undetachably disposed in the outlet opening 42.

As is clearly shown in FIG. 1, an overpressure bypass valve 66 is disposed on the free end of the support tube 22 facing away from the bottom 26. The overpressure valve 66 opens when a limit pressure is exceeded, such that unfiltered oil can flow from the receiving space 18 via the pressure tube 30 to the oil outlet 32.

Figure 5:
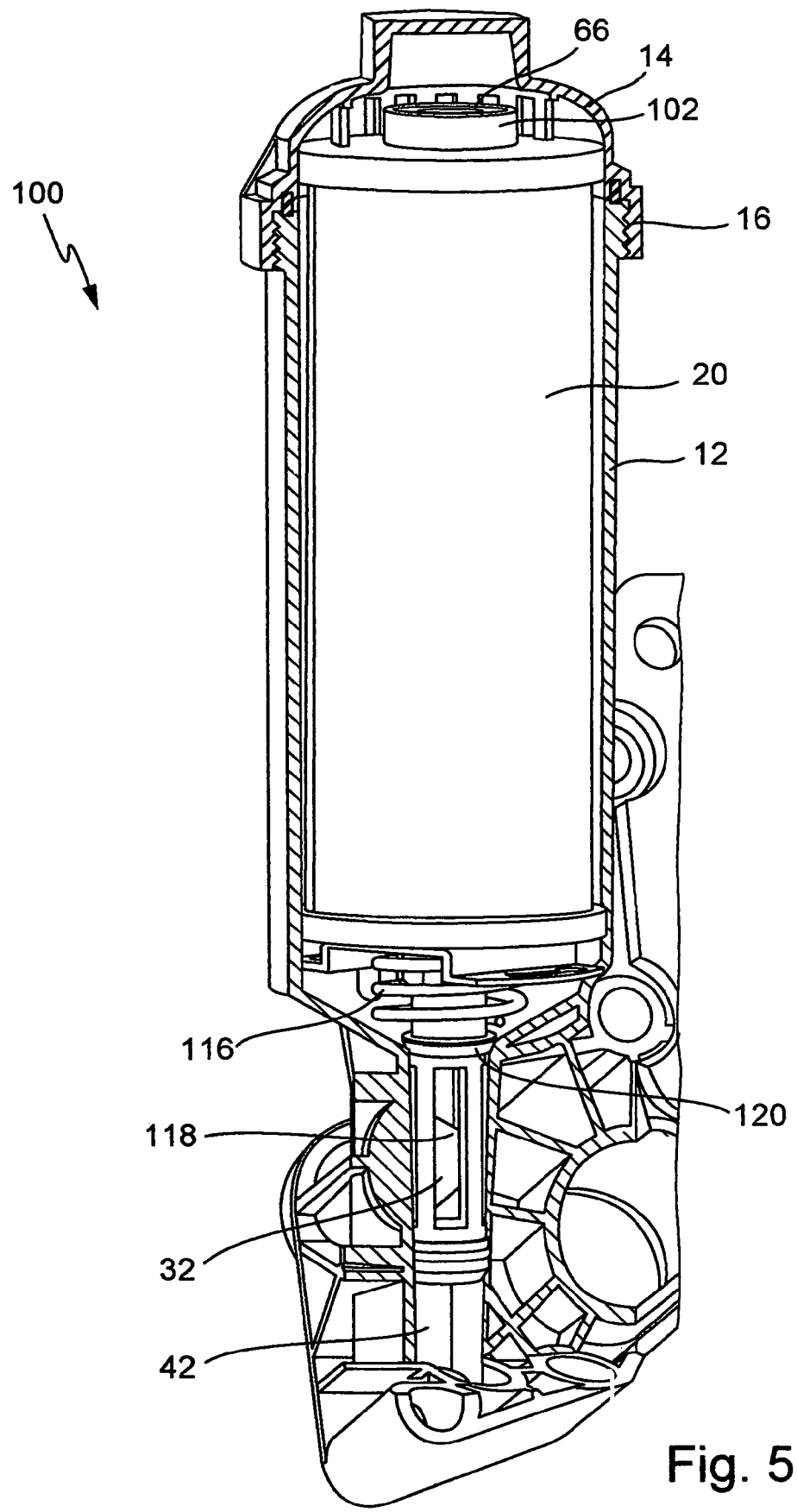
FIG. 5 shows a longitudinal section through a second inventive oil filter arrangement.
Figure 6:
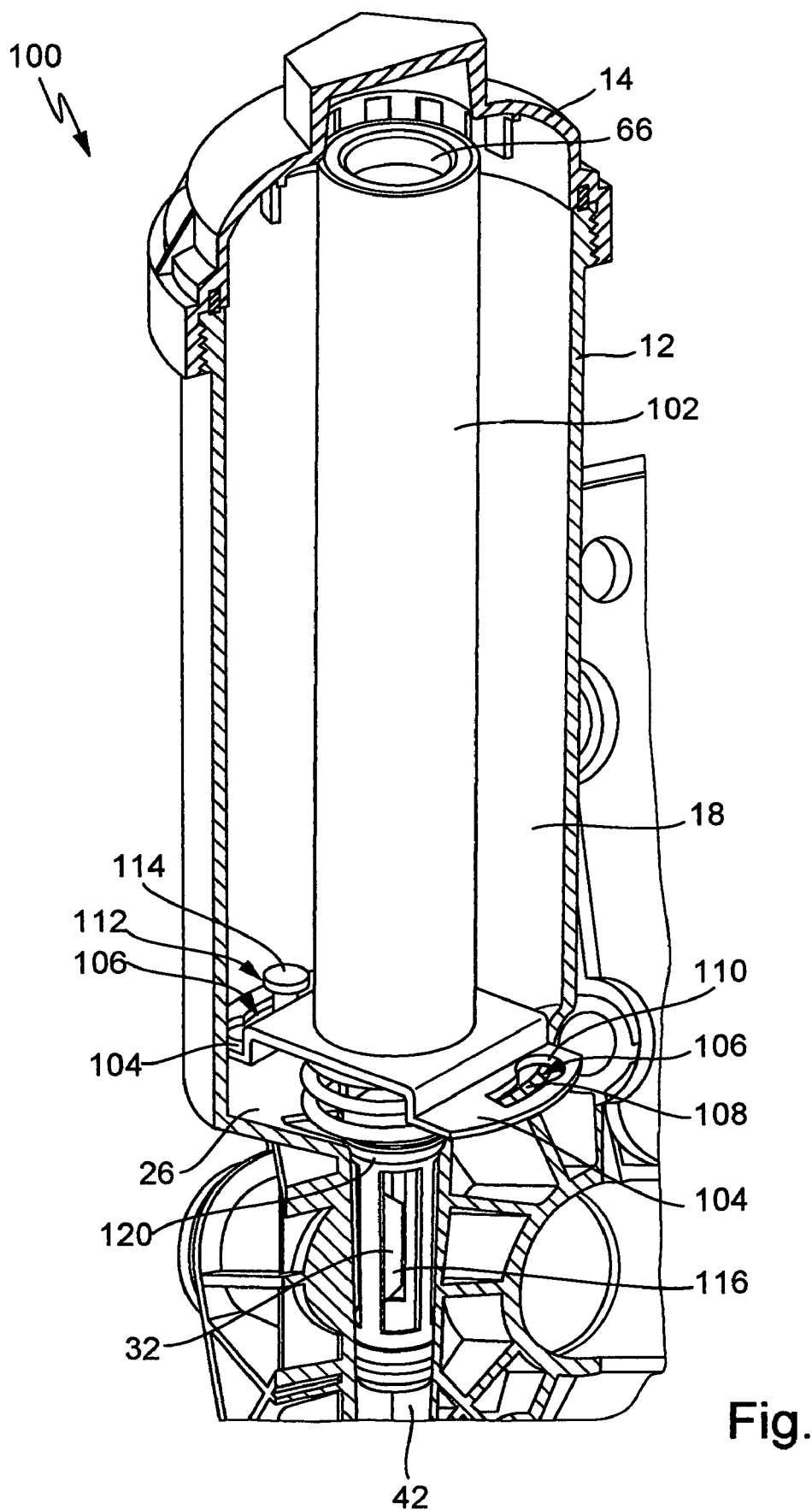
FIG. 6 shows a section similar to FIG. 5 from a different perspective without filter element.
Figure 7:
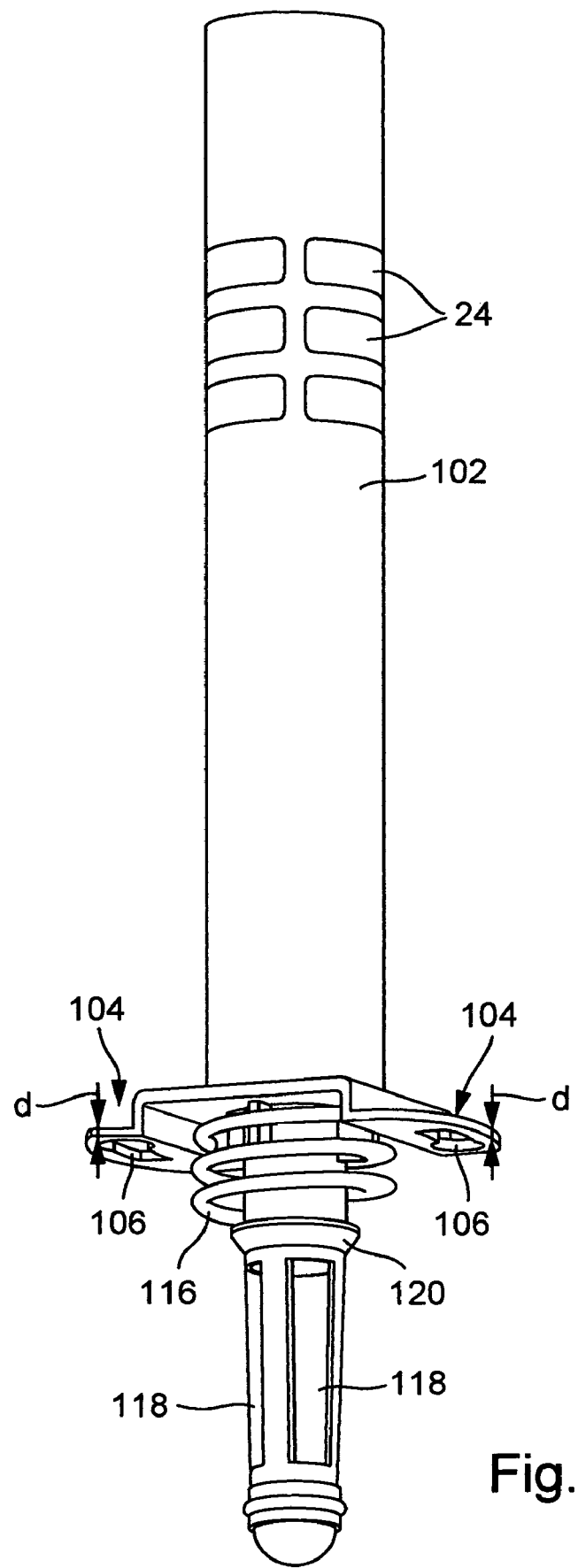
FIG. 7 shows the individual parts of the support tube of FIGS. 5 and 6.

FIGS. 5 through 7 show a second inventive oil filter arrangement 100, wherein the components that correspond to the oil filter arrangement 10 of FIGS. 1 through 4 are designated with corresponding reference numerals.

The oil filter arrangement 100 has mounting sections on the support tube 102 in the form of feet 104 that project in a radial outward direction (FIGS. 6 and 7). The feet have bayonet-shaped pin recesses 106 which have a ring segment section 108 extending about the center longitudinal axis of the support tube 102, and a circular annular section 110 that follows the ring segment section 108.

As is clearly shown, in particular, in FIG. 6, connecting pins 112 are provided on the bottom 26 of the receiving space 18, which have a mushroom head-like widening 114 at their free end. The diameter of the mushroom head-like widening 114 is thereby at least slightly smaller than the clearance surface of the circular annular section 110 and larger than the width of the respective ring segment section 108. In this fashion, the support tube 102 may be retained like a bayonet in the receiving space 18.

The connecting pins 112 may e.g. be produced from plastic material, wherein the connecting pins 112 may initially be formed as cylinders and obtain the mushroom head-like widening 114 only after insertion of the support tube 102 e.g. by hot riveting. In accordance with the invention, the connecting pins 112 may e.g. also be realized by screws that can be screwed into the housing and comprise corresponding screw heads.

The separation between the bottom 26 of the receiving space 18 and the lower edge of the widening 114 of the oil filter arrangement 100 in accordance with FIGS. 5 through 7 is approximately two to ten times larger and, in particular, approximately 5 times larger than the thickness d of the two feet 104 extending in the axial direction. This enables limited axial motion of the support tube 102. Towards this end, the support tube 102 can be axially displaced from an operating position assumed when the receiving space 18 is closed, into a outlet position that can be assumed when the receiving space 18 is open or when the lid 14 is removed. For automatic displacement of the support tube 102 from the operating position into the outlet position, a spring element 116 is provided which is supported on the bottom 26 of the receiving space 18 and also on the support tube 102 or on the side of the feet 104 facing the bottom 26.

As is clearly shown in FIGS. 5 and 6, the support tube 102 engages the oil outlet 32 on the side facing away from the filter element 20 or the lid 14. The support tube 102 has outlet recesses 118 in the section of the support tube 102 which is completely disposed in the oil outlet 32 in the operating position of FIGS. 5 and 6. The outlet recesses 118 are followed on the side facing the feet 104 by a circumferential sealing collar 120. In the operating position shown in the figures, the sealing collar 120 acts sealingly against a housing section that corresponds with the sealing collar 120 in the transition area between the receiving space 18 and the oil outlet 32. In the operating position, the filtered purified oil flowing through the filter element 20 in a radial direction, flows via the oil outlet 32 out of the filter arrangement 100 to the consumer.

When the housing lid 14 is opened, the support tube 102 is displaced by the spring element 116 in an axial upward direction until the feet 104 abut the lower side of the widenings 114. In this outlet position, the outlet recesses 118 correspond with the receiving space 18 such that the oil provided in the receiving space 18 can flow into the outlet opening 42 via the outlet recesses 118.

The support tube 102 has openings 24 (indicated in FIG. 7) in the area where it cooperates with the filter element 20.

We claim:

1. An oil filter arrangement for accommodation of a filter element, the oil filter arrangement comprising:
    a housing defining a receiving space for the filter element, said housing structured to support oil flow in a radial direction through the filter element;
    connecting pins mounted to said housing proximate to a bottom of said housing and disposed about a central longitudinal axis of said receiving space, each of said connecting pins having a shaft and a widened head disposed at an upper end of said shaft;
    a support tube structured and disposed to support the filter element within said housing, the support tube being inserted into said receiving space and mounted to said housing in such a fashion that it remains in said housing when the filter element is exchanged, wherein a side of said support tube facing said bottom of said housinq has mounting areas structured as radially outward projecting feet or as an at least partially circumferential, radially outward projecting collar, said mounting areas having pin openings through which said shafts of said connecting pins pass, said support tube comprising a lower drain section extending below said mounting areas and passing through a central opening in said bottom of said housing, said drain section having outlet recesses;
    a sealing collar disposed about said lower drain section between said mounting areas and said outlet recesses; and
    a spring element disposed between said bottom of said housing and said mounting areas to urge said support tube in an upward direction, wherein, in an operating position of the oil filter arrangement, said sealing collar seals said central opening of said housing bottom and, in a filter replacement position of the oil filter arrangement, said spring urges said support tube in an upward direction, thereby vertically displacing said mounting areas into abutment against lower surfaces of said widened heads of said connecting pins and lifting said sealing collar out of engagement with said central opening to permit direct passage of unfiltered oil from said receiving space to said outlet recesses.

2. The oil filter arrangement of claim 1, wherein said support tube is locked, screwed, fastened like a bayonet or permanently fastened to said housing.

3. The oil filter arrangement of claim 1, wherein said connecting pins are designed as rivet pins or as hot riveting pins.

4. The oil filter arrangement of claim 1, wherein said connecting pins are designed as locking pins.

5. The oil filter arrangement of claim 1, wherein said housing comprises mounting sections designed as webs that extend in an axial or radial direction, upper sides of which facing the filter element each bearing at least one said connecting pin.

6. The oil filter arrangement of claim 1, wherein said connecting pins have a mushroom head-like widening in an area of free ends thereof, wherein a separation between said bottom of said receiving space and a lower edge of said widening is at least slightly larger than a thickness of said mounting areas in an axial direction thereof.

7. The oil filter arrangement of claim 1, wherein said support tube surrounds a pressure tube which is closed in a radial direction and disposed at a radial separation from said support tube in an area of said bottom of said receiving space.

\* \* \* \* \*